United States Patent [19]
Keene

[11] Patent Number: 5,103,249
[45] Date of Patent: Apr. 7, 1992

[54] FOLDING DISPOSABLE CAMERA APPARATUS IN COMBINATION WITH INSTANT FILM

[76] Inventor: Lauren Keene, 12 Cannon St., Mattapoisett, Mass. 02739

[21] Appl. No.: 602,490

[22] Filed: Oct. 24, 1990

[51] Int. Cl.⁵ .................................................. G03B 17/50
[52] U.S. Cl. ...................................... 354/85; 354/187; 354/245; 354/288
[58] Field of Search ........................ 354/83, 84, 85, 86, 354/187, 192, 193, 194, 245, 304, 288

[56] References Cited

U.S. PATENT DOCUMENTS

| | | | |
|---|---|---|---|
| 3,672,275 | 6/1972 | Johnson | 354/85 |
| 4,518,235 | 5/1985 | Reed et al. | 354/86 |
| 4,660,951 | 4/1987 | Reed et al. | 354/187 |

Primary Examiner—L. T. Hix
Assistant Examiner—Howard B. Blankenship
Attorney, Agent, or Firm—Thomas A. Kahrl

[57] ABSTRACT

A folding disposable camera for use with instant film for taking photographs typically with eight black and white or color photographs in a 4"×5" and 3¼"×4¼" format, foldable between a packaged stacked position and a picture taking position, including a frame for mounting a foldable enclosure constructed of a unitary blank of sheet material having a plurality of side panels and a front wall for enclosing the instant film positioned in a film container provided in the frame, the frame having a spreader bar apparatus attached at an open end for providing an exit path for the film and film tab including a spreader bar having a slanted groove, an upper tab channel and a lower tab channel the spreader bar acting to release developer contained with the instant film, with a lens and shutter mechanism being mounted on the front wall, and a method of packaging the folding disposable camera with a pack of instant film in a unitary package.

4 Claims, 5 Drawing Sheets

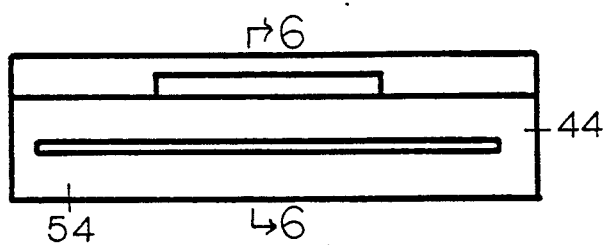
FIG. 5
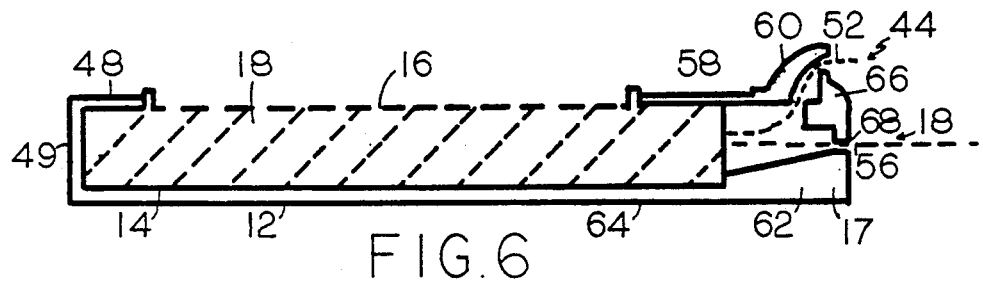
FIG. 6
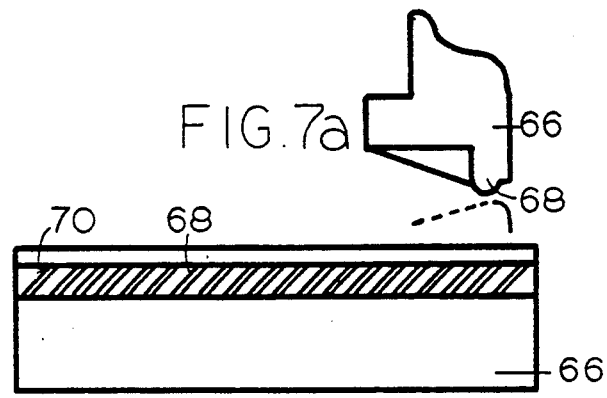
FIG. 7a
FIG. 7b
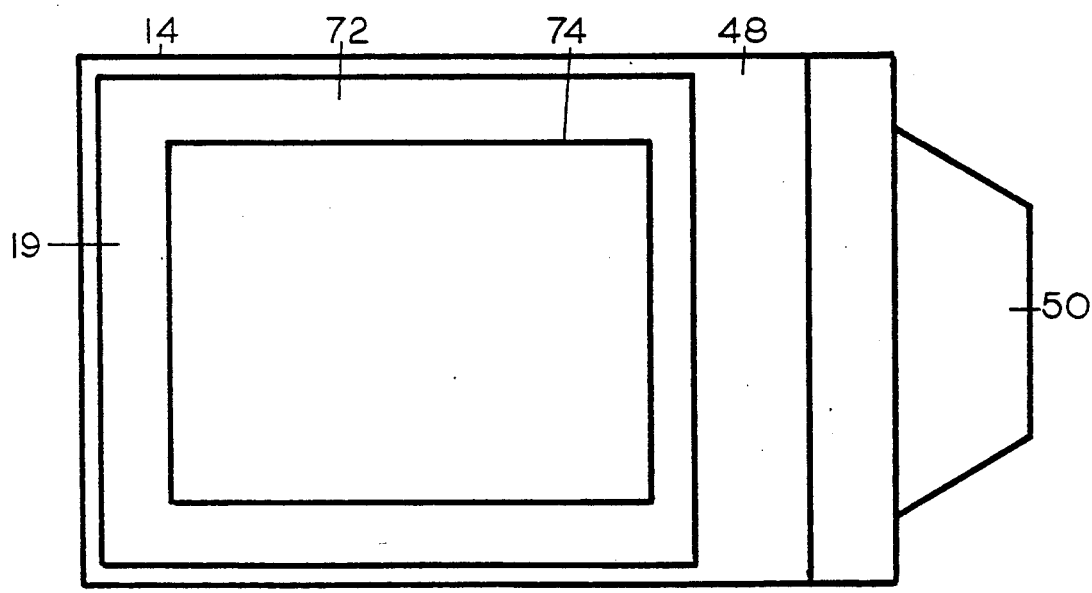
FIG. 8

FOLDING DISPOSABLE CAMERA APPARATUS IN COMBINATION WITH INSTANT FILM

BACKGROUND OF THE INVENTION

It is well recognized that traditional photographic cameras are cumbersome to carry, particularly on extended trips, such as vacation trips and being fragile are subject to damage.

Disposable camera systems have been known in the art for use with both conventional film and instant film for some time For example, a disposable camera has been designed for taking a single picture from an instant film packet and then be disposed of, one such camera being disclosed in U.S. Pat. No. 4,660,951 issued Apr. 28, 1987 and conventional cameras are now available for taking a roll of conventional film and then being disposed of with the film being separately processed and developed into pictures.

A draw-back of instant disposable cameras known in the art has been that after only one picture has been taken the camera must then be disposed of. Furthermore, such cameras have not been adapted to be collapsed for compact packaging with a packet of instant film for sale and use together.

Conventional automatic cameras include very sensitive mechanisms such as light meters and automatic focusing mechanisms which are easily damaged in travel and are sensitive to radiation from surveillance mechanisms particularly surveillance mechanisms utilized in airport terminals. Rays from such surveillance devices may damage the sensing apparatus of automatic cameras as well as damaging the film contained therein. As a result of the above carrying cameras on airline travel has become increasingly inconvenient and cumbersome with the result that many cameras are now left at home, creating a need for inexpensive cameras which could be purchased together with instant film at a location remote from the users usual residence.

It is therefore desirable to provide for an improved, effective, inexpensive and lightweight disposable camera apparatus utilizing instant film and to a method of packaging a disposable camera with a film pack which has the advantage of use and operation not possessed by prior art disposable cameras.

SUMMARY OF THE INVENTION

The invention relates to a folding disposable camera apparatus in combination with instant film and a method of packaging instant film together with a disposable camera in a unitary, compact container.

In particular the invention relates to a folding disposable camera apparatus, typically a flat folding apparatus, including a generally trapezoidal shaped film enclosure formed of a unitary blank of foldable sheet material in combination with instant film for making a plurality of photographs, a lens, a shutter, a generally rectangular frame for mounting the film enclosure including a film container and a spreader bar apparatus. The folding film enclosure having first and second paired sidewalls foldably joined to each other along longitudinal fold lines includes a plurality of front wall panels foldably joined together and having an open end for enclosing the film, typically instant film packets of black and white or color film in a 4"×5" and 3¼"×4¼" format, the open end of the enclosure mounted on a film container frame for enclosing the film packets. The folding film enclosure permits folding sequentially between a first flat position with the unitary blank of foldable sheet material entirely flat, and a second stacked packaging position wherein the multiple pairs of sidewalls and front wall panels are folded in a multi-layer stack and a third film enclosure position with the first and second pairs of sidewalls and front wall panels fitted together to form a trapezoidal film enclosure having a generally trapezoidal configuration to form a light lock when mounted on the frame. The unitary blank of foldable sheet material, typically constructed of lightweight inexpensive material preferably biodegradable, such as paper, formed to provide for first and second pairs of sidewalls and multiple panels of the front wall arrangement including a first pair of aperture panels, a second pair of side panels and a third pair of side panels, each panel being joined sequentially by fold lines formed from the unitary blank permitting folding sequentially between the flat sheet position, the second package position and the film enclosure position. To form a camera with a trapezoidal film enclosure, the blank is sequentially folded with the side walls are folded inwardly with the other free longitudinal sides being secured by an attachment device, such as velcro, with the front wall panels folded inwardly with the outer edges secured by an attachment device also such as velcro.

The film enclosure is mounted on the frame surrounding the film container by securing the peripheral edges of the open end of the film enclosure, when in the folded enclosure position fastening being accomplished by fastening means such as velcro. The frame is of generally rectangular construction having a closed end and an open end and a back wall constructed to prevent passage of light, and includes a film compartment for placing and retaining a package of instant film having a plurality of film packets. When installed in the container a tab extending from the end of the packet for manually grasping and for advancing the film extends through an opening provided in the open end.

The film enclosure also includes a lens typically constructed of conventional plastic and having a fixed focal length mounted on the first front wall of the film enclosure provided for forming a controlled image of an object projected on the film positioned in the film container, the light passing through the aperture in the front wall, the lens being adapted to cover the aperture in the front wall. A shutter is provided for controlling the passage of light through the aperture, the shutter being mounted adjacent the aperture on the front wall adapted to be moved between an open and a closed position and consisting of a shutter card of rectangular construction with a central slot and an outwardly projecting handle for extending outwardly through an opening in the side of the front walls for manual operation and including a spring clip mounted adjacent the shutter for returning the shutter to a closed position.

The spreader bar apparatus is mounted at the open end of the frame, typically integrally molded to the frame, and includes an end plate extending transversely across the open end of the frame having a lower channel, typically an lower elongated film channel, providing a compressive exit path for the film packets upon being manually advanced by pulling the conventional film tab provided with the film means; a top plate attached above the end plate in coplanar relationship therewith having an arched central guide member for guiding the tab and including an upper tab channel for providing an exit path for the film tab. The spreader bar apparatus also includes an inclined ramp for directing the film packets toward the lower channel extending from the back wall to the end plate and a spreader bar means for applying a compressive force on the film packet as they are drawn out of the film container through the lower channel, disposed intermediate the upper tab channel and the lower film channel which provides for a lower exit for the film and an upper exit for the film tab including a ridge extending across the bottom of the spreader bar, the ridge having diagonal grooves for compressively spreading and releasing the developer contained within the instant film packets.

The disposable camera when folded in the folded stacked packaging position may be positioned adjacent the film container for packaging in combination with the film packet typically with shrink packaging. Such a package can be adapted for display in a retail store.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

Other features and advantages of the present invention will become more fully apparent from the following detailed description of the preferred embodiment, the appended claims and the accompanying drawings in which:

FIG. 5 is an end view of the open end of the frame of the invention of FIG. 1 showing the end plate;

FIG. 6 is a sectional view taken along line 6—6 of FIG. 5 showing the film container of the invention, including the film pack and the spreader bar and guide of the invention;

FIGS. 7a and 7b are enlarged views of the bottom view of the spreader bar assembly and cross sectional view shown in FIG. 6 as A—A;

FIG. 8 is a top plan view of the film container of the invention;

DETAILED DESCRIPTION OF THE PREFERRED EMBODIMENT

Figure 1:
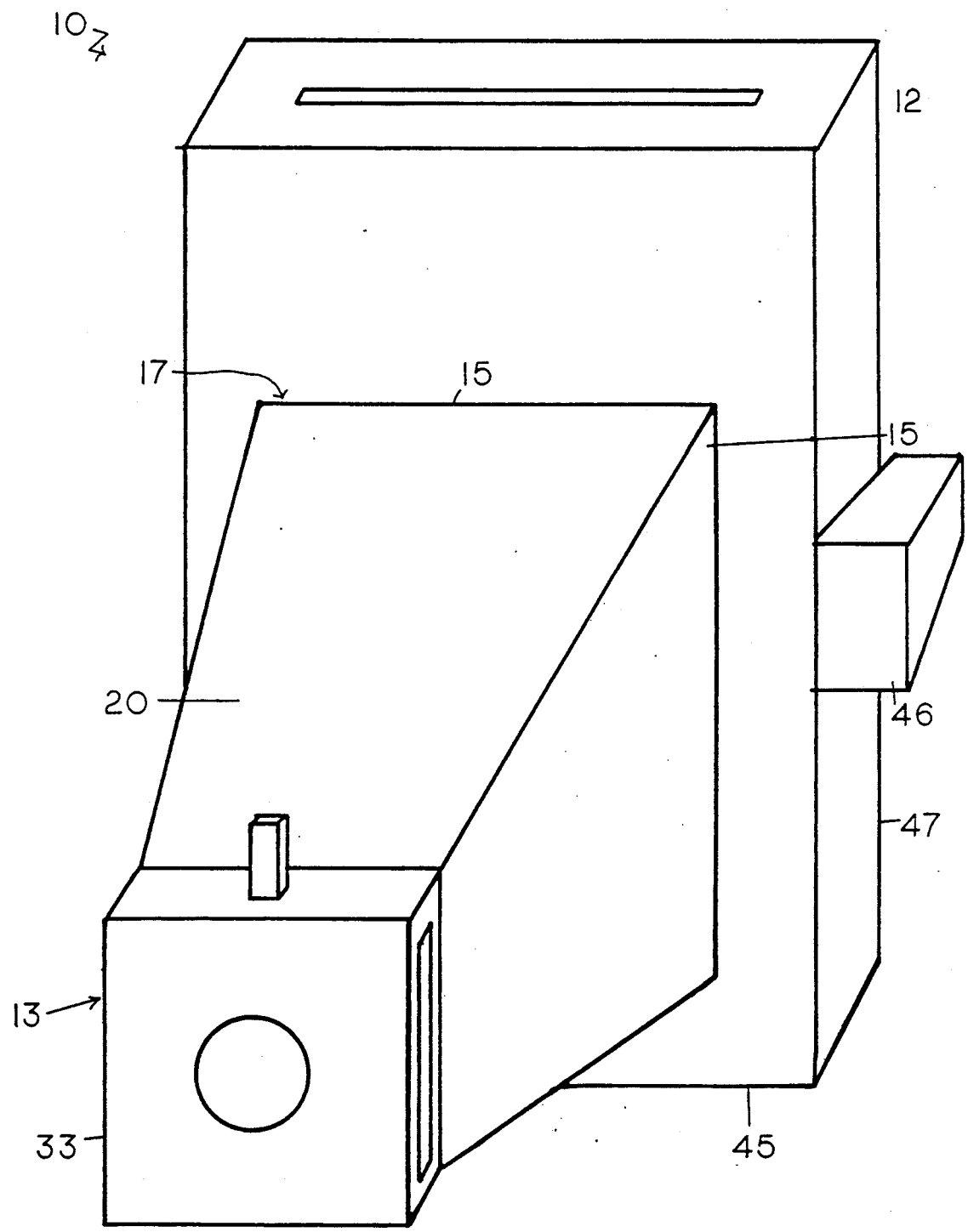
FIG. 1 is a front elevational view of the folding disposable camera apparatus embodying the present invention shown in the enclosed picture taking position.

The preferred embodiment of the present invention is illustrated by way of FIGS. 1 through 10. With specific references to FIGS. 1 and 2, a folding disposable camera apparatus 10 is shown including a frame 12 which includes a film container compartment 14 as shown in FIGS. 6 and 8 for enclosing an instant film pack 16, typically containing a plurality of instant film packets 18.

A hollow film enclosure 20 is mounted on the frame 12 being attached by fasteners 15 having a closed end and an open end and which is of generally rectangular construction and box-like design extending in perpendicular outward relationship to the frame 12.

Figure 2:
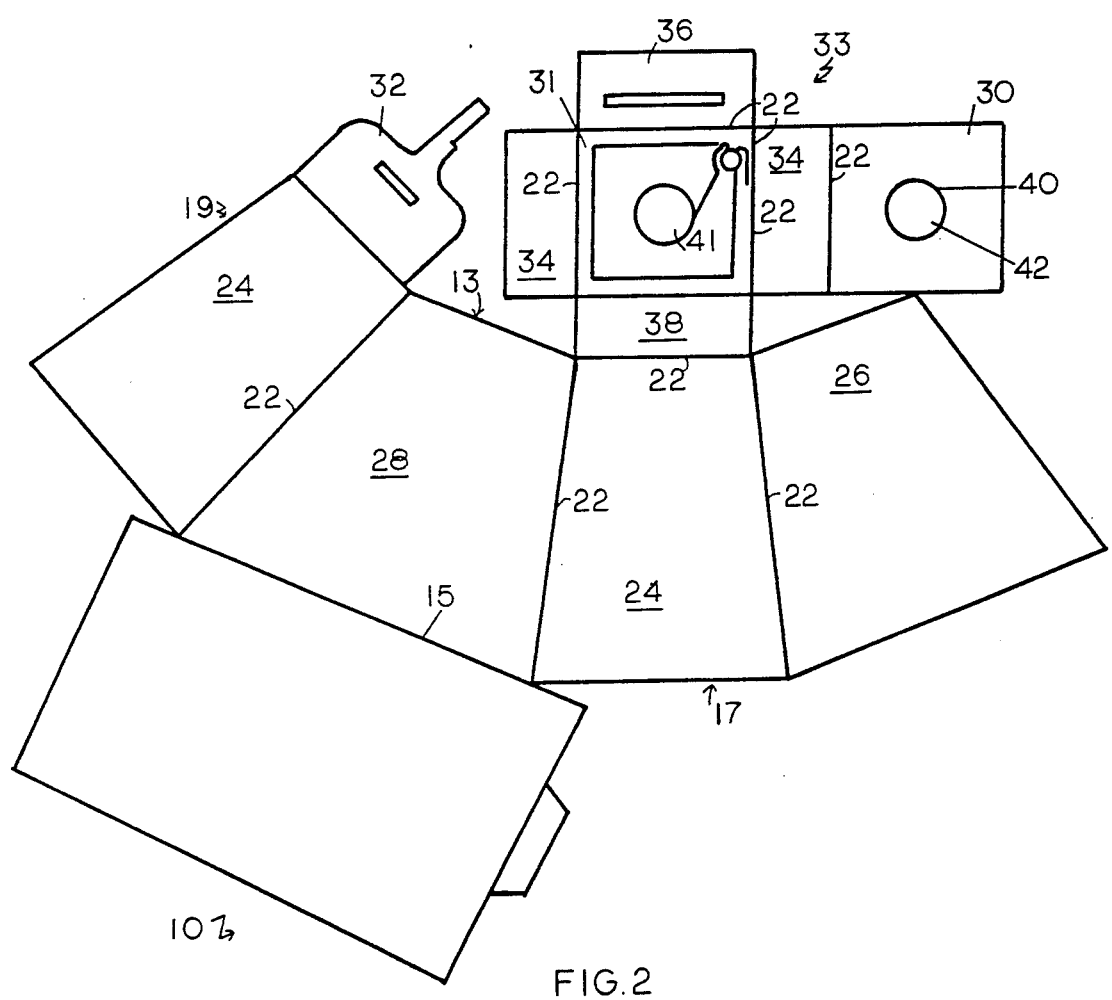
FIG. 2 is a top plan view of the disposable camera apparatus of the invention shown in the flat position.
Figure 3:
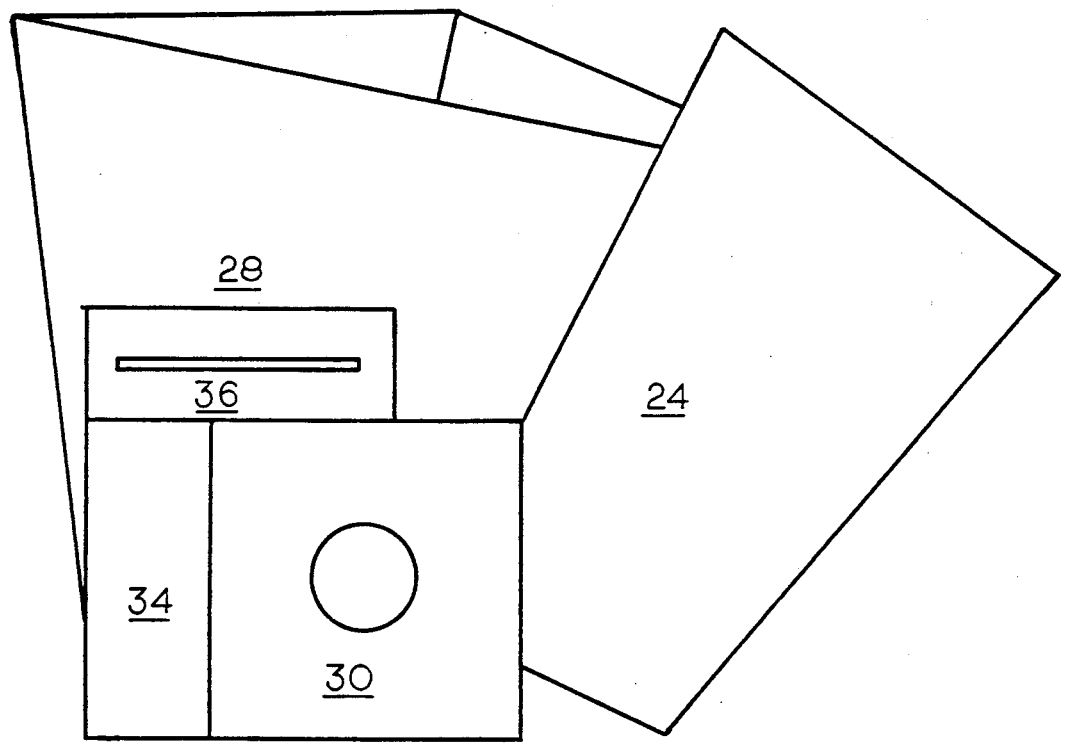
FIG. 3 is a top plan view of the disposable camera apparatus of the invention shown in the stacked packaged position.

The film enclosure 20 is foldable and consists of a unitary sheet of material 19, typically constructed of paper, shown in FIG. 2 in a flat position typically of cardboard treated to be moisture resistant or alternatively a sheet of plastic, and constructed to prevent penetration of rays of light to provide a series of interconnected panels. The unitary sheet 19 comprises a plurality of panel members comprising a total of 10 individual panels being provided with folding creases 22 formed intermediate each panel, the panels comprising a pair of side panels 24, a top panel 26, a bottom panel 28, a pair of front wall panels 30 and 31, a slotted shutter card 32, a pair of connector panels 34, a slot panel 36, and a bottom wall panel 38. The front wall assembly 33 is attached to the bottom wall panel 38 by a folding crease 22 and a bottom wall panel 38 is joined to the side wall panel 24 via crease 22, and includes a slotted side panel 36 together with a spring means 35 for actuating the shutter card 32, and is provided with holes 40 and 41 and with a lens 42 mounted on hole 40. The spreader apparatus is mounted transversely across the open end of the frame 12 with a view finder 46 of conventional construction mounted on the upper side of the frame 12, the frame 12 having an upper side 45 and a lower side 47.

Figure 4:
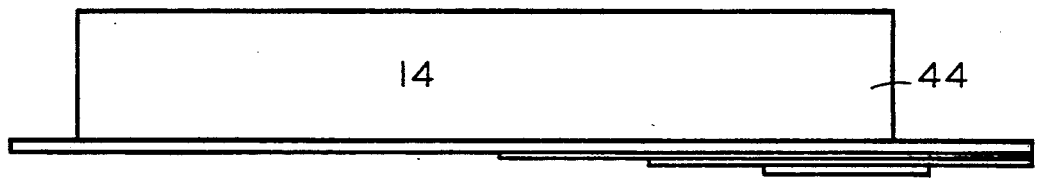
FIG. 4 is a side view of the disposable camera apparatus of the invention showing the folded enclosure apparatus attached to a pack of film in the stacked packaged position.
Figure 9:
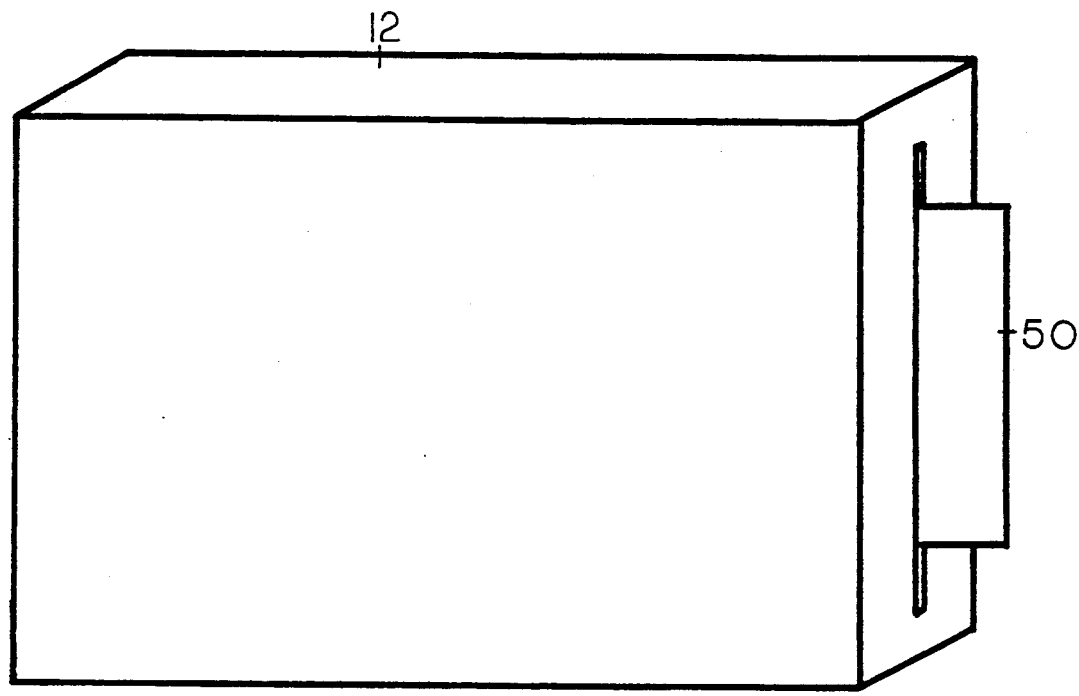
FIG. 9 is a back view of the film container of the disposable camera of the invention.
Figure 10:
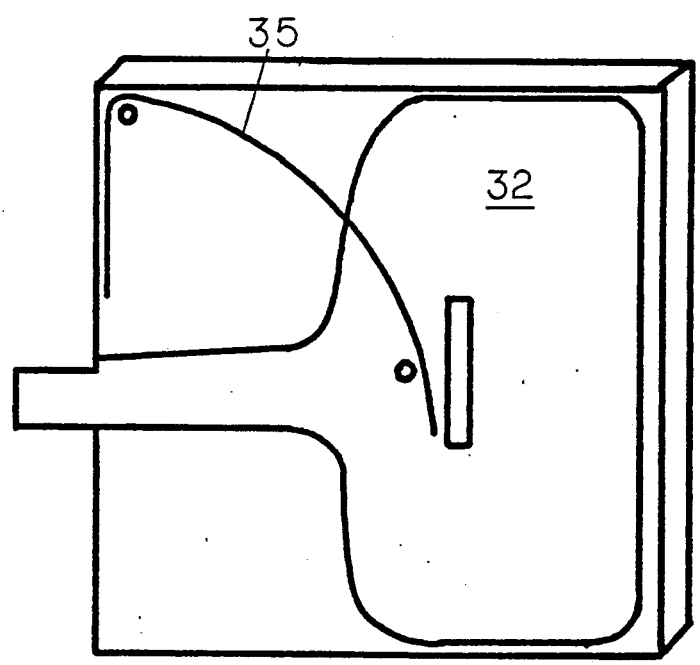
FIG. 10 is an exploded view of the shutter assembly of the invention shown in FIG. 1.

The frame 12 typically consists of a case 48 for enclosably accepting a film container 49 of instant film, typically a Fuji instant color film, for example FP-100, the container 49 being of metallic, generally rectangular construction. Contained within the frame 12 as is shown in FIG. 4 is instant film 16 containing a plurality, generally eight in number, of instant flat film packets 18, typically attached sequentially in a folded link multipack of construction well known in the art, each print having a tab 50, all other features of the instant film being well known in the art.

As typically packaged, the film pack 16 is contained within the frame 12 with a tab 50 of the first film packet 18 extending outwardly through an upper tab channel 52 provided in the spreader bar apparatus 44 to be positioned to extend through the slot provided by the tab channel 52 to be accessible for manually grasping and pulling the film packets 18 between a packaged position and a picture taking position by holding tab 50.

The spreader bar apparatus 44 is integrally molded to the frame 12 at the open end 17 for providing a plurality of exit channels for the film packets 18 and the tab 50 and includes an end plate 54 extending transversely across the open end 17 of the frame 12 having a central lower elongated film channel 56 comprising a top plate 58 having an arched central guide member 60 and the central upper tab channel 52. Also included in the spreader bar apparatus 44 is an incline ramp 62 extending outwardly from the back wall 64 of frame 12 and inclined upwardly toward the lower film channel 56, and includes a spreader bar 66 disposed intermediate the upper tab channel 52 and the lower film channel 56 for providing a lower exit channel for the film packets 18 and an upper exit channel for the film tab and includes a ridge 68 extending across the bottom of the spreader bar 66, the ridge 68 having diagonal grooves 70 for compressing the film packet 18 to release developer known in the art to develop the film packet to produce a photograph.

As typically packaged, the film packet 18 is contained within the frame 12 with a tab 50 of the film of the first film packet 18 extending outwardly through the upper tab channel 52 to be accessible for manual grasping by the operator for pulling the film packet between a packaged position and a picture taking position within the film compartment 14. Upon manually pulling of the tab by an operator, the film 18 is advanced to a position framed by border 72 behind enclosure 20 with the film located directly in line with film border aperture 74 such that light passing through the lens 42 provided in the front wall 40 is projected upon the film packet 18 to expose the film and create a picture.

What is claimed is:

1. A combined disposable camera and instant film apparatus which apparatus comprises;
   A) an instant film means for making a plurality of photographs including deveioper means;
   B) a frame having an open end, a closed end and a back wall characterized by a film compartment for receiving and containing the instant film means and having a tab for manually advancing the instant film means;
   C) a spreader means integrally fastened to the frame at the open end for providing a plurality of exit channel means for channeling the film means and for compressively releasing the developer means for developing photographs;
   D) a ramp adjacent the back wall of the frame and inclined upwardly for guiding the film means upon manually drawing the film means from the film compartment;
   E) a spreader bar adjacent the exit channel means including ridge means extending across the bottom of the spreader bar, the ridge means having grooves for compressing the instant film means and releasing the within contained developer means as such means is manually drawn through the spreader bar after exposure of the film means;
   F) a folding enclosure means for enclosing the instant film means and providing controlled exposure thereof having a first pair of sidewalls, a second pair of sidewalls and a pair of front wall panels, including a first front wall panel and a second front wall panel joined by fold lines permitting folding between a first flat position, a second folded stacked position and a third film enclosure position, the enclosure means being adapted for mounting on the frame when in the third film enclosure position;
   G) an aperture means for providing an opening in the front wall panels;
   H) a lens means for covering the aperture means and making a controlled image of an object upon the film means contained in the film compartment;
   I) a view finder means for aiming the camera;
   J) a shutter means for controlling the passage of light passing through the aperture means.

2. The disposable camera apparatus of claim 1 wherein the spreader means comprises;
   i) an end plate extending transversely across the open end of the frame characterized by a lower elongated film channel for providing a lower exit channel for the instant film means;
   ii) a top plate having an arched central guide member characterized by an upper exit channel for providing a duct for the tab provided on the instant film means.

3. A folding camera apparatus comprising;
   a) a camera enclosure means adapted to be mounted on a frame containing film means and providing controlled exposure thereof in a light lock having a plurality of sidewalls including at least four side walls including a first pair of sidewalls, a second pair of sidewalls and a pair of front wall panels, including a first wall panel and a second wall panel permitting folding between a firs flat position, a second folded stacked position and a third film enclosure position, wherein the enclosure means is adapted for mounting on the frame and the panels and the first pair of sidewalls, the second pair of side walls and the front wall panels are mutually foldably joined to each other by longitudinal fold lines permitting folding;
   b) the frame adapted to receive instant film, the frame means comprising an end plate extending transversely across the open end of the frame characterized by a lower elongated film channel for providing a lower exit for film, the top plate having an arched central guide member characterized by an upper exit channel for providing an upper exit channel for a tab;
   c) a spreader means fixedly mounted on the frame comprising a spreader bar;
   d) a ramp adjacent the back wall of the frame;
   e) an aperture means for providing an opening in the first front wall panels;
   f) a lens means for covering the aperture means and making a controlled image of an object upon the film means;
   g) a view finder means for aiming the camera apparatus;
   h) a shutter means for controlling the passage of light passing through the aperture means into the folding enclosure means, the shutter means being mounted adjacent the aperture means on said first front wall panel and adapted for moving between an open position and a closed position.

4. The flat folding camera apparatus of claim 3 wherein the camera apparatus is disposable.

* * * * *